Jan. 15, 1924. 1,480,698

D. W. SHIEK

POWER DRIVEN OPERATING MEANS FOR TYPEWRITERS AND THE LIKE

Filed Oct. 5, 1921 7 Sheets-Sheet 1

Fig. 3.

Jan. 15, 1924. 1,480,698
D. W. SHIEK
POWER DRIVEN OPERATING MEANS FOR TYPEWRITERS AND THE LIKE
Filed Oct. 5, 1921 7 Sheets-Sheet 5
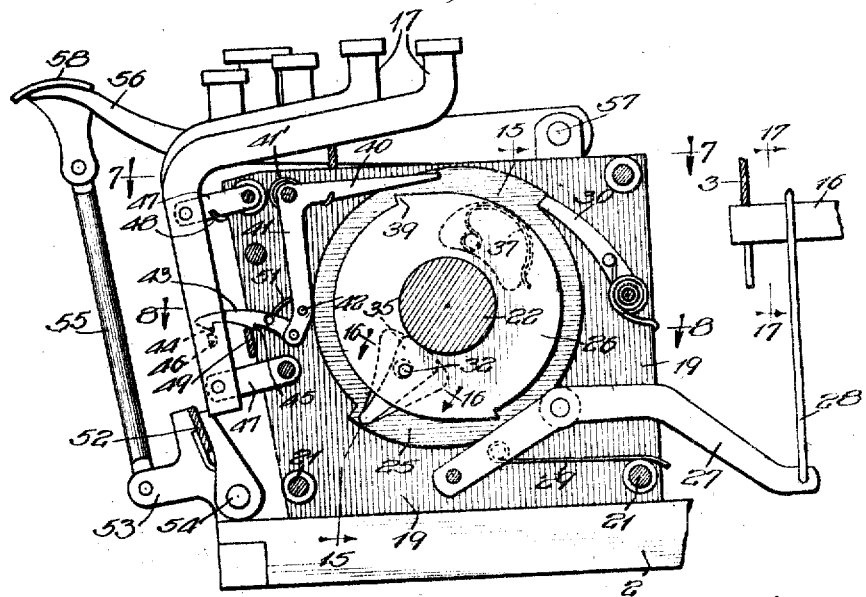
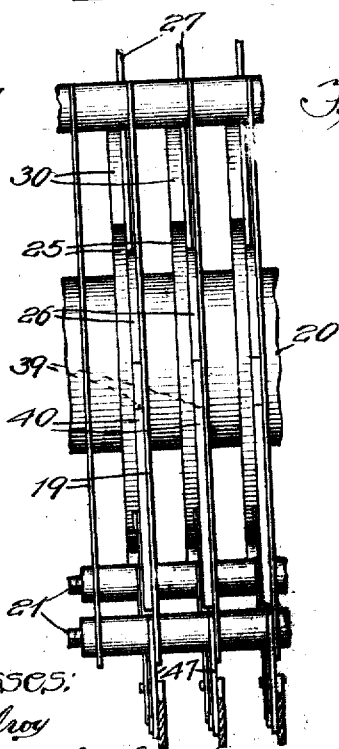
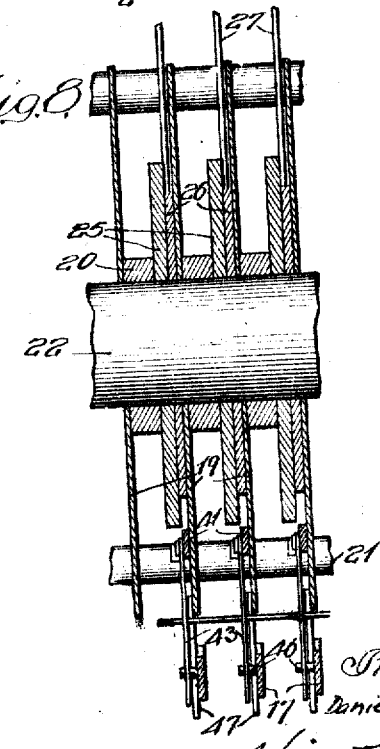

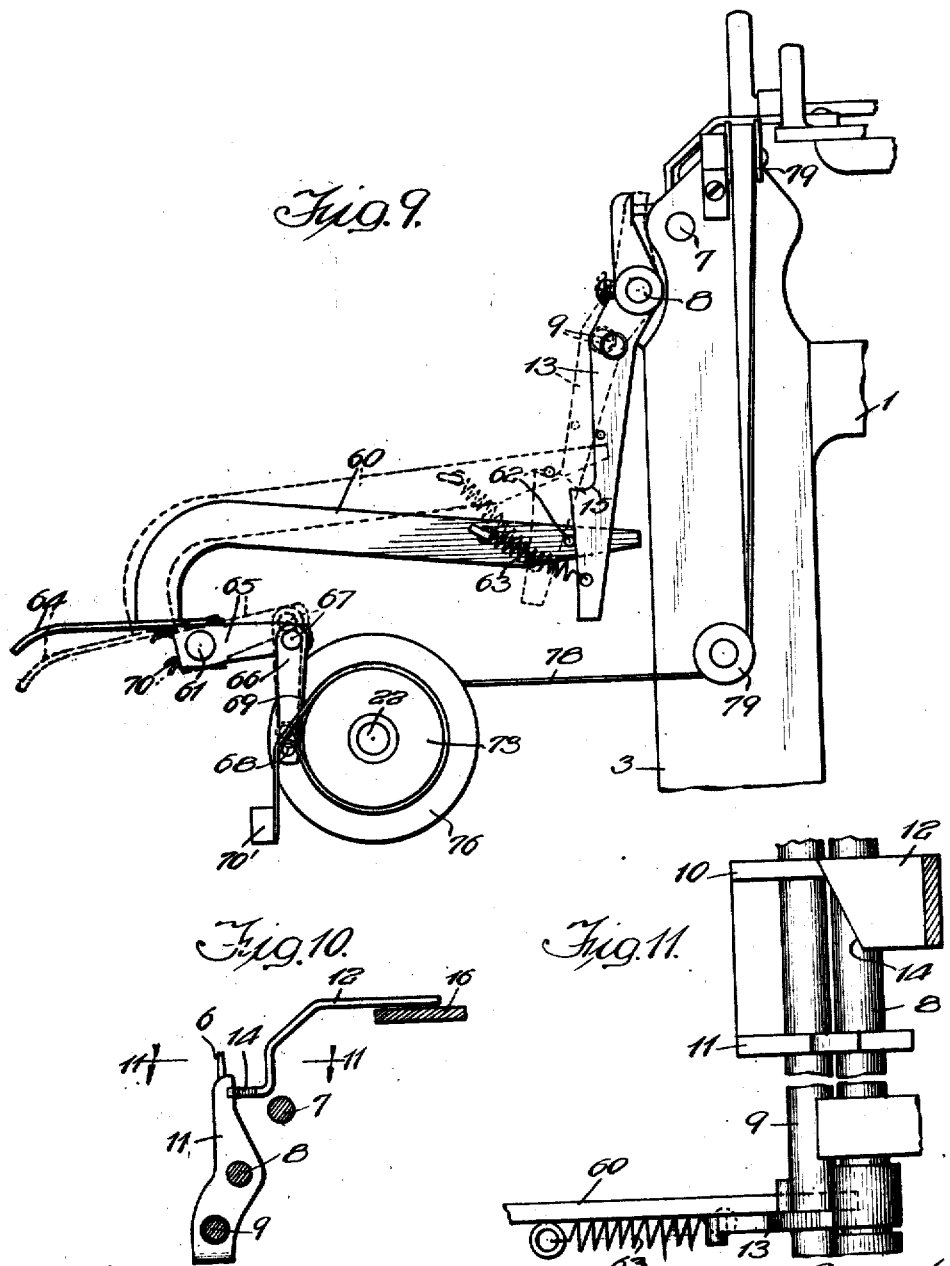

Jan. 15, 1924.   1,480,698
D. W. SHIEK
POWER DRIVEN OPERATING MEANS FOR TYPEWRITERS AND THE LIKE
Filed Oct. 5, 1921   7 Sheets-Sheet 7
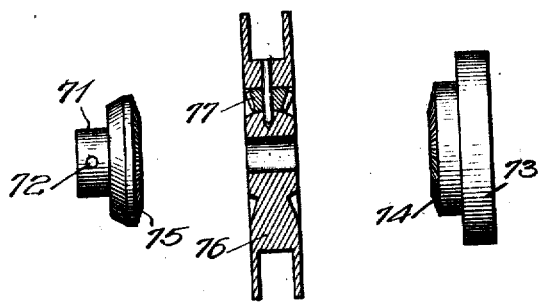
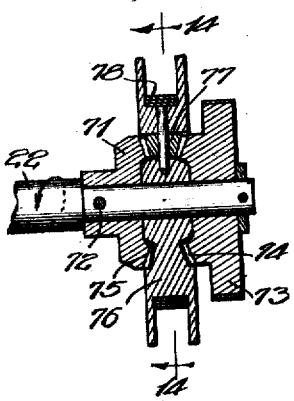
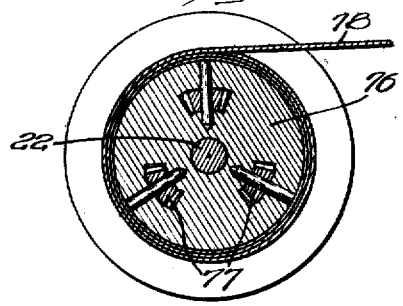
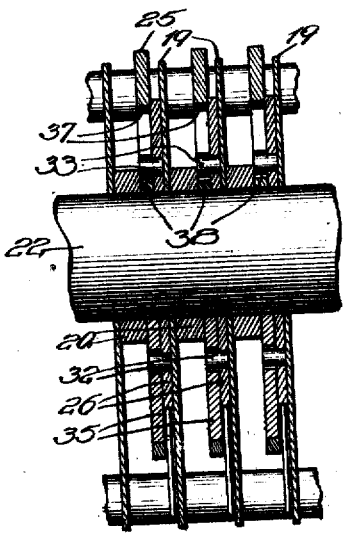
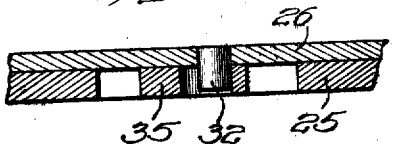
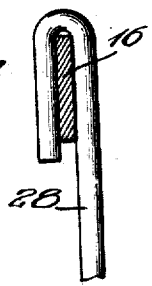
Inventor:
Daniel W. Shiek Patented Jan. 15, 1924.

1,480,698

UNITED STATES PATENT OFFICE.

DANIEL W. SHIEK, OF AURORA, ILLINOIS, ASSIGNOR TO S. E. MILLER, OF AURORA, ILLINOIS, TRUSTEE ON BEHALF OF SAID DANIEL W. SHIEK AND MILLER-BRYANT-PIERCE COMPANY, A CORPORATION OF ILLINOIS.

POWER-DRIVEN OPERATING MEANS FOR TYPEWRITERS AND THE LIKE.

Application filed October 5, 1921. Serial No. 505,544.

*To all whom it may concern:*

Be it known that I, DANIEL W. SHIEK, a citizen of the United States of America, residing at Aurora, in the county of Kane and State of Illinois, have invented certain new and useful Improvements in Power-Driven Operating Means for Typewriters and the like, of which the following is a description.

My device relates to improvements in typewriters or other key-controlled writing machines, and more particularly to a typewriter having an electric motor or other suitable power drive for the operation of the moving parts thereof.

One of the objects of my invention is to provide means in a typewriter as above described for preventing the accidental movement of the type bars or type keys when the machine is not in use.

Another object of my invention is to provide means for preventing the accidental repeating of the type bars and to provide adjustable automatic means for returning the carriage to its normal starting position.

Another object of my invention is to provide means for spacing or shifting the carriage between words, said means being operated by the lifting or raising of the operator's hand from the keyboard.

Other objects of my invention are to provide a device as above described which shall be simple in operation, durable, economical in construction, reliable and satisfactory and efficient for use wherever found applicable.

To this end my invention consists in the novel construction, arrangement and combination of parts herein shown and described, and more particularly pointed out in the claims.

In the drawings, wherein like reference characters indicate like or corresponding parts, Fig. 1 is a front elevation of my device;

Fig. 3 is a side elevation similar to that shown in Fig. 2 but taken on the opposite side;

Fig. 6 is a view similar to that shown in Fig. 4, showing a type bar drive cam in operative position;

Fig. 7 is a sectional view taken on the line 7—7 of Fig. 6;

Fig. 8 is a sectional view taken on the line 8—8 of Fig. 6;

Fig. 9 is a detail showing the operation of the brake band control;

Fig. 10 is a section taken substantially on the line 10—10 of Fig. 1;

Fig. 11 is a section taken substantially on the line 11—11 of Fig. 10;

Fig. 12 is a disassembled detail of the carriage return tape-winding mechanism;

Fig. 13 is a section taken on the line 13—13 of Fig. 3.

Fig. 14 is a section taken substantially on the line 14—14 of Fig. 13;

Fig. 15 is a section taken substantially on the line 15—15 of Fig. 6;

Fig. 16 is a section taken substantially on the line 16—16 of Fig. 6;

Fig. 17 is a section taken substantially on the line 17—17 of Fig. 6.

Figure 1:
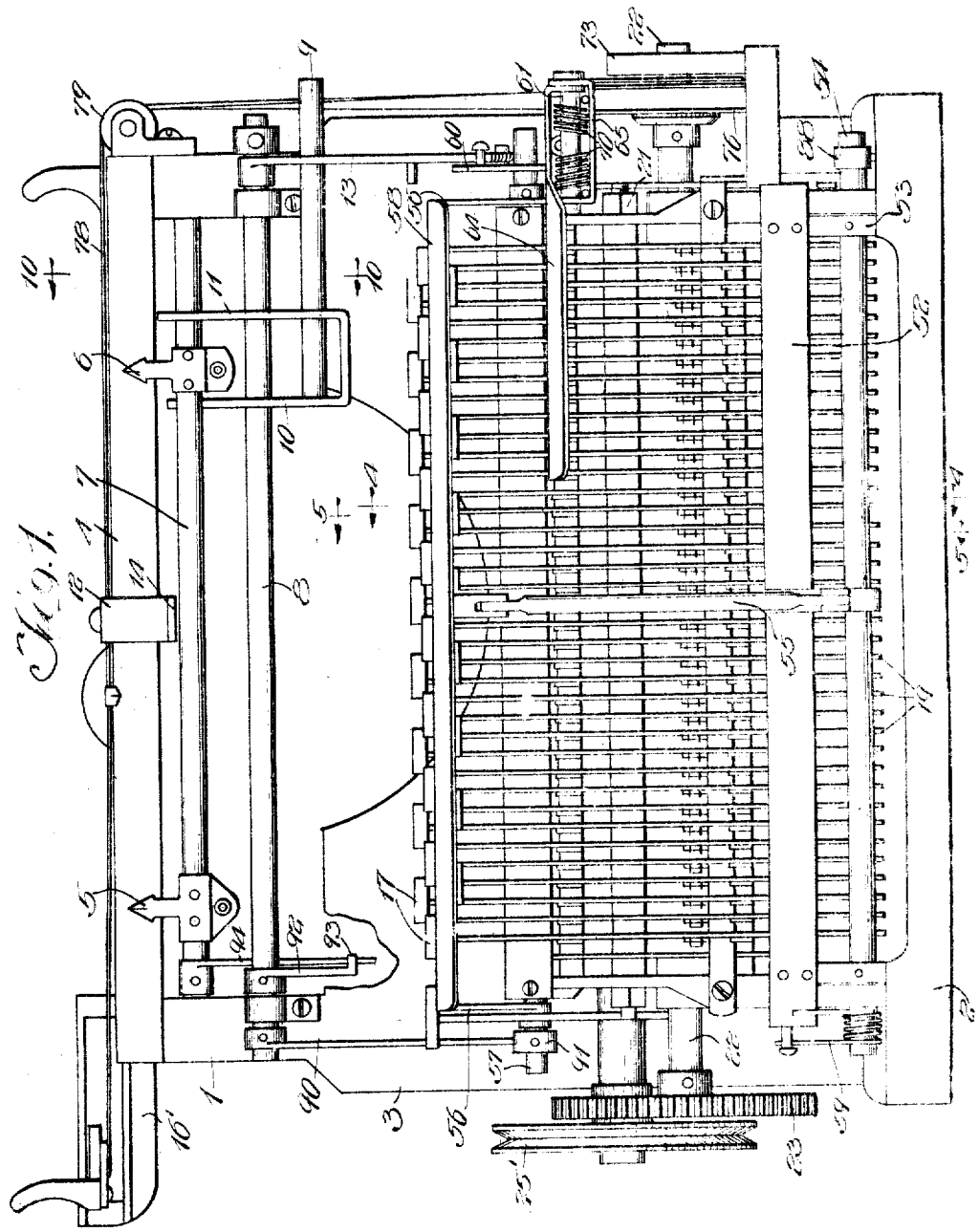

In the drawings, wherein I have illustrated the preferred embodiment of my invention, there is shown a typewriter having a frame 1, with a front wall 3 and a base 2. The scale guide 4 extends across the frame, and the marginal stops 5 and 6 are adjustably mounted upon the rod 7 between the sides of the frame, as shown in Fig. 1. A carriage 16 is slidable laterally of said frame, in suitable guides, there being suitable carriage shifting mechanism (not shown). A rod 8 is arranged parallel to the rod 7 between the sides of the frame, being rotatably mounted therein at its ends. Slidably and pivotally mounted on the rod 8, for a purpose to be hereinafter described, is a U-shaped member having arms 10 and 11, one arm being arranged at each side of the marginal stop 6, said U-shaped member being fixed to a rod 9, slidably adjustable relative to the frame and carried by a lever 13 pivoted to the bar 8. An arm 12, having a tapered cam face 14 is mounted on the movable carriage 16', whereby when said arm is at a certain predetermined point of carriage travel its cam face 14 will engage said yoke 10—11 and pivot it about the rod 8 to swing the rod 9 and the lever 13, said lever having a hook adjacent its lower end for a purpose to be hereinafter described.

Figure 3:
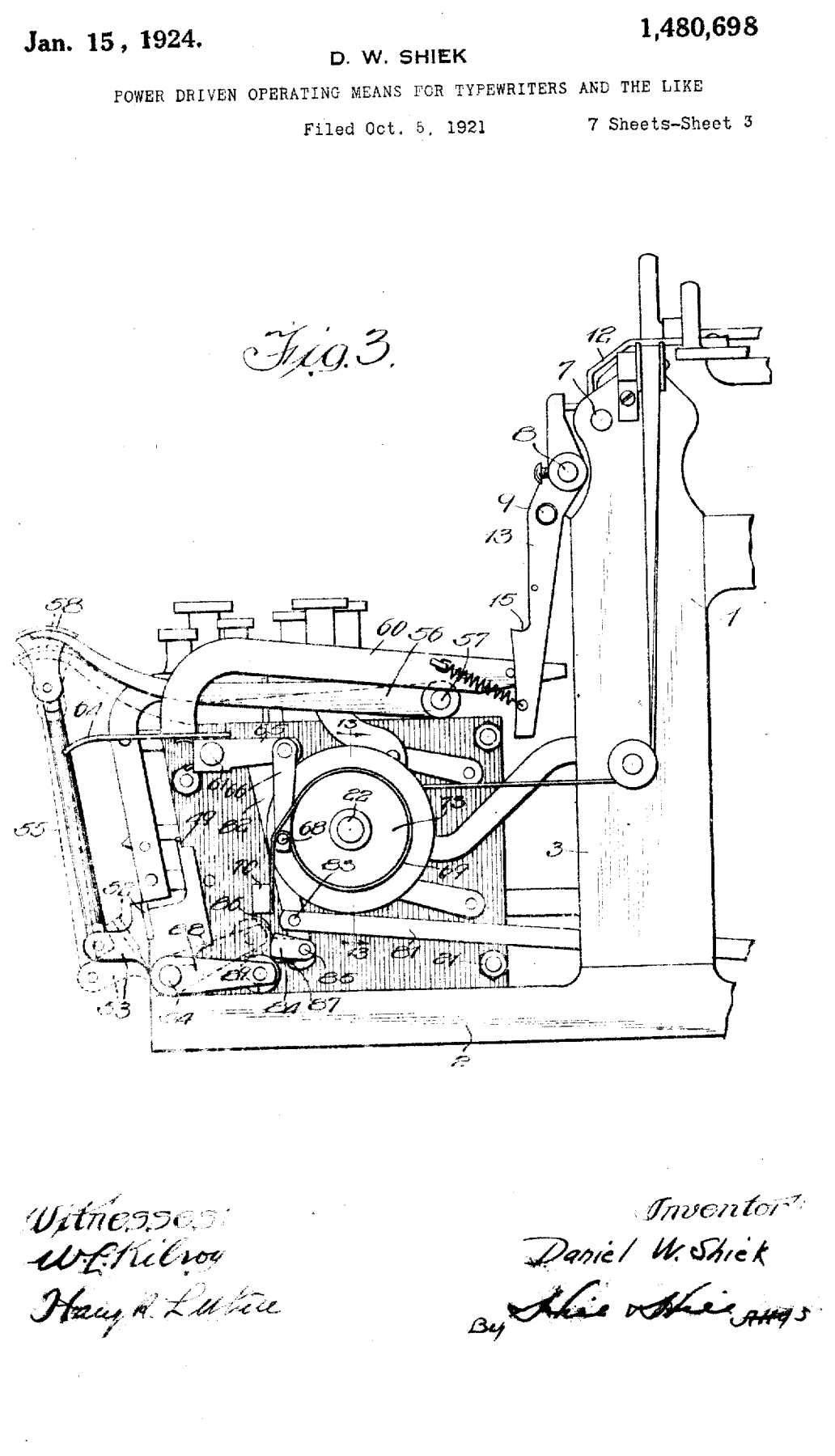
Figure 4:
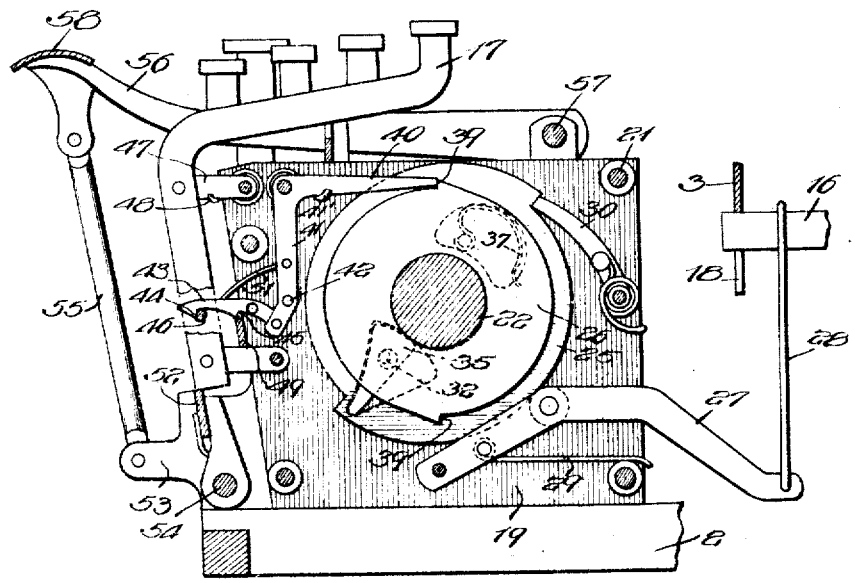
Fig. 4 is a sectional view taken substantially on the line 4—4 of Fig. 1.
Figure 5:
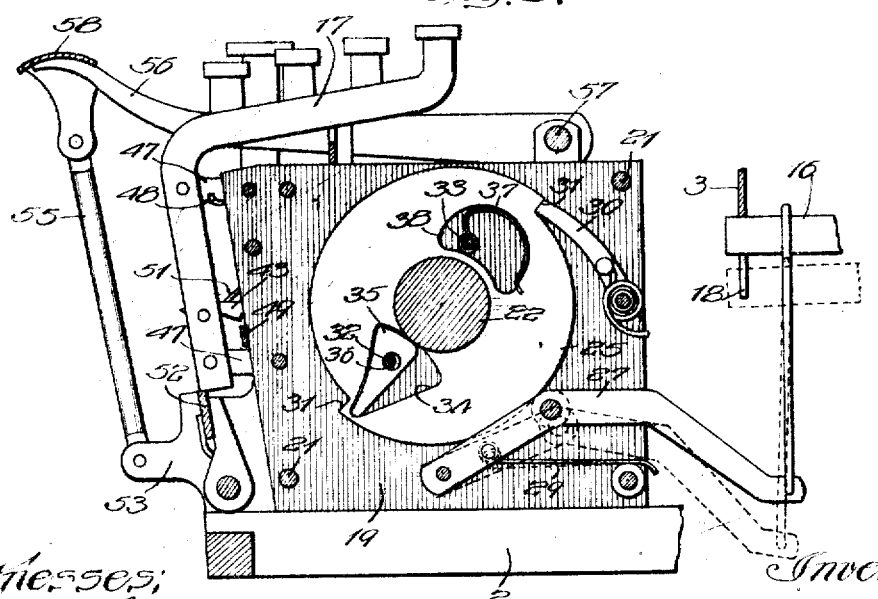
Fig. 5 is a sectional view taken substantially on the line 5—5 of Fig. 1.

The key levers 16 for the type bars, as shown in Figs. 4, 5 and 6, are not connected to their individual type keys 17, but are cut off short at the front wall of the frame 3, said levers being slidable vertically in guide slots 18 in said front wall. As shown in Figs. 1 to 8 inclusive, the key-supporting mechanism comprises a plurality of partition walls 19 spaced apart by collars 20 or the like (Fig. 8). Bolts 21 extend from side to side of said frame through said partitions to hold them in place, said partitions having aligned apertures therethrough, through which is extended a drive shaft 22, one end of which is connected to a gear wheel 23 or the like, intermeshing with a gear 24 (Fig. 2) driven by a pulley wheel 25', said pulley wheel being connected to any suitable source of power, as an electric motor or the like (not shown).

The drive shaft 22 is continuously rotated, so that the key levers for the type bars must be intermittently connected thereto and actuated thereby. A pair of cam discs 25, 26, (Figs. 5, 8 and 15) are arranged so as to be freely revoluble on the shaft between each pair of partitions, that is, there is one pair of cam discs for each type bar operating key. The disc 25 has a pair of peripheral cams thereon, as shown more clearly in Fig. 5, said peripheral cams being operably engageable with a link 27, carrying a link 28 at its end, the upper end of said link 28 being looped over the key lever 16, (Figs. 4, 5 and 6) whereby a half rotation of said cam disc 25 will actuate said key lever once. Assuming that the drive shaft rotates at 300 revolutions per minute, it is seen that each type bar may be operated 600 times per minute, or twice in each revolution of the cam disc 25. A spring 29 tends to return the link 27 to its normal position after each actuation thereof. A pawl 30 is arranged to engage the peripheral abutments 31 of the cam disc 25 to hold said disc in proper position and prevent its backward rotation.

Pins 32 and 33 project laterally from the disc 26, at circumferentially spaced points thereon, said disc 25 having an opening 34 therein opening onto said shaft and adapted to receive a pivotal dog 35 or overrunning clutch member. The dog 35 has an aperture 36 therethrough adapted to loosely receive the pin 32, the thickness of said dog being substantially that of the cam disc 25.

A spring 37 is arranged in the slot 38 in the disc 25', one end of said spring bearing against the pin 33 and tending to partially rotate said discs relatively of one another, whereby the dog 35 is moved into clutching or gripping engagement with the shaft 22, so that when said dog clutches the shaft the cam discs will be rotated to actuate the key levers.

Abutments 39 are provided on the periphery of the cam discs 26, (Fig. 4)—there being two abutments shown, said abutments being engageable with an arm 40 of a bell-crank lever 40—41, said bell-crank lever being pivoted to a partition 19, and movable to its outward position by being engageable at 42 with the cam surface periphery of the disc 25. A spring 41' is arranged at the bell crank, tending to release it from the abutment 39. At the free end of the arm 41 is pivotally carried a pawl 43 (Figs. 4 and 6), having a pair of spaced hooks 44, 45, thereon, the outer hook 44 being adapted to engage over the pin 46 carried by each of the keys 17. Each of the keys 17 is pivoted to the partitions by means of links 47, there being springs 48 for returning said keys to their normal raised position after each depression thereof. A stationary bar 49 is arranged across the front of said partitions, below the normal raised position of the hook-engaging pin 46 of the key as shown in Figs. 4, 5 and 6, said bar being adapted to be engaged by said pawls in the downward movement of said keys, and holding them while the keys are depressed past the bar, thereby releasing the pawl from said key. A spring 51 is so arranged between the bell crank lever 40—41 and the pawl 43 that it tends to move said pawl downwardly.

Assuming that the parts are in the position shown in Fig. 4, that is, that the clutch is released and the shaft runs free, the depressing of the key 17 will release the pawl 43 from the holding pin 46, whereby the bell crank lever arm 40 will be swung upwardly in the direction of the arrow shown in Fig. 6, so as to release it from its holding engagement against the abutment 39, whereupon the spring 37 will partially rotate the disc 26 a slight distance relatively to the disc 25 so that the pin 32 will engage the dog 35 to draw it into clutching engagement with the rotating shaft 22, whereupon both said discs will be driven a half revolution, the abutment 39 again engaging the bell crank lever arm 40, the peripheral edge of the disc 25 engaging the link 27 to operate the key lever for type bar and at the same time pivoting the bell crank 40 to engage the abutment 39 and simultaneously moving the pawl 43 outwardly so as to ride over the stationary bar 49 and become engaged by the pin 46, as shown in Fig. 4. The dog will unclutch when the disc 26 is held by the bell crank, due to the rotational play between the discs, allowing the shaft to run free or overrun the dog.

In order to prevent the accidental repeating of the type bar, should the key be held down, partial rotation of the cams by the drive shaft will cause the second or inner hook 45 to engage over the bar 49 because the pin 46 is held below the top of the bar 49 and the spring 51 urges the pawl downwardly. The releasing or raising of said key will permit the pin 46 to engage the hook 44, as it is across its path of movement, raising said pawl to release it from the bar 49, said pawl moving inward a slight distance when released from said bar, said hook and bar being out of registry, whereupon the key may be operated or depressed again to release said pawl from the pin 46 to throw the bell crank lever to operate the type bar in the usual manner.

Figure 2:
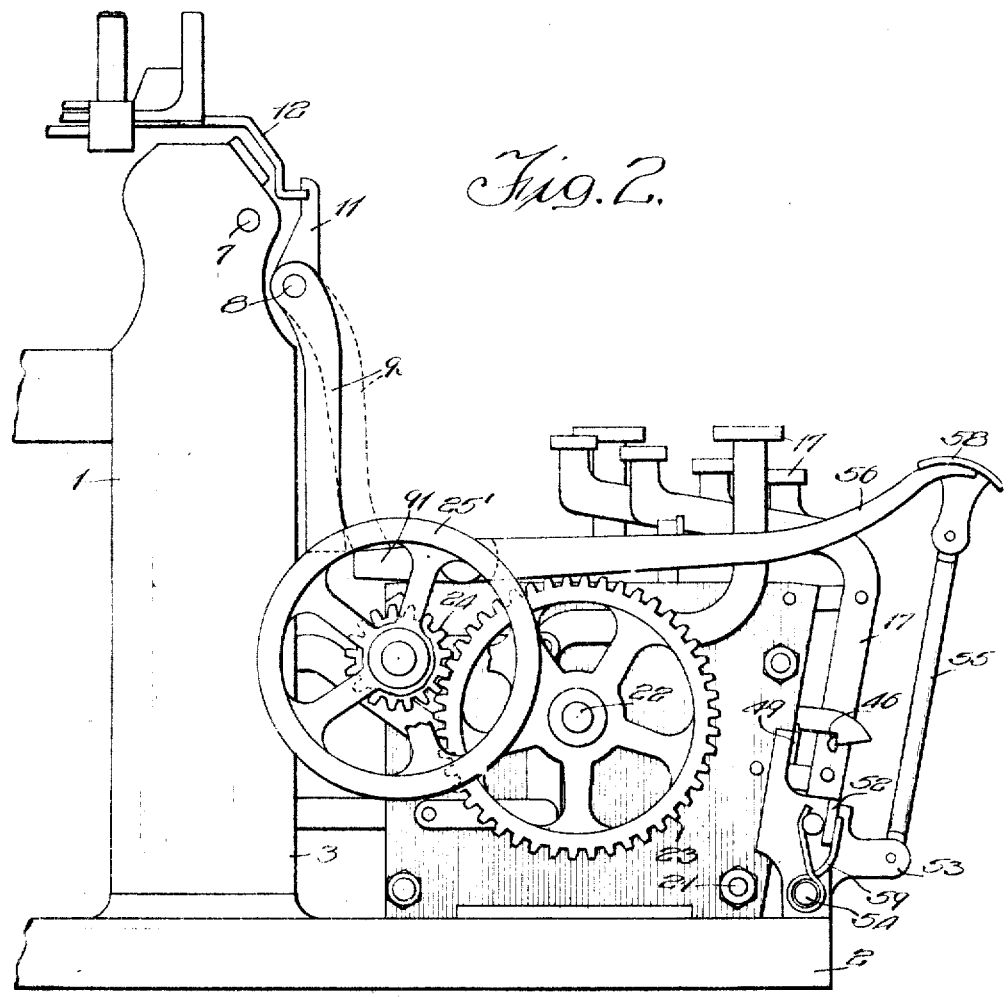
Fig. 2 is a side elevation thereof with portions broken away.

In order to prevent the accidental operation of the keys 17, I have provided a bar 52 at the lower end of said keys, as shown in Figs. 3 to 5, said bar being secured to arms 53, pivotally mounted at 54 to the ends of the frame. A central lever 55 is pivoted to the arm 53 and extends upwardly where it is pivotally supported by an arm 56, pivoted to the frame at 57. The upper transversely extending portion 58 of the lever 55 is curved or convexed so as to comfortably receive and support the wrists or hands of the operator, the weight of the operator's hands releasing the bar 52 from its locking engagement with the ends of the keys 17. As soon as the operator leaves the machine or removes his hands from the lever 55, the bar 52 again raises into locking position, there being a spring 59, as shown in Fig. 2, for returning said bar to its locking position.

With my improved device the carriage may be returned mechanically after having moved a predetermined amount of travel, without shifting it by the thumb piece, as is ordinarily done. A lever 60 (Fig. 9), mounted on a pivot pin 61, has a pin at the rear free end thereof, said pin being engageable in the hook 15, provided in the lever 13, as previously described, there being a spring 63 connected at its ends to the levers 13 and 60, below the interengaging hook and pin 15 and 62 respectively, and tending to pull said levers to the position shown in full lines in Fig. 9. At the outer end of the lever 60 is arranged a striking plate 64, (Figs. 1 and 9) whereby the lever may be actuated by the operator. A link 65 is mounted on the pivot pin 61, the rear end of said link having another link 66 pivotally secured thereto at 67. The lower or free end of the link 66 has a pin 68 projecting laterally therefrom and adapted to receive one end of a brake band 69, the opposite end of said brake being secured to any stationary part, as shown at 70' in Fig. 9. A pair of coil springs 70, as shown in Figs. 1, 3 and 9 are arranged between the parts 65 and 64, tending to release said brake band and restore said parts to the normal position shown in full lines in Fig. 5.

Mounted on one end of the drive shaft 22 (see Figs. 12 to 14) is a gear wheel 71, said gear wheel being secured to said shaft by any suitable fastening means, as, for instance, a pin or set-screw 72. A brake wheel or sheave 73 is freely, rotatably mounted on the shaft 22, said brake sheave having gear teeth 74 thereon facing the gear teeth 75 of the gear 71. Intermediate the gear 71 and the brake wheel 73 is rotatably mounted a reel 76, said reel having one or more pinions 77 rotatably carried thereby, the rotational axis of said pinions being arranged laterally of the rotational axis of said shaft 22, said pinions intermeshing with both the gear faces 74 and 75 of the parts 73 and 71 so that when the brake wheel 73 is held stationary, the shaft 22 will drive the reel 76, and when the brake wheel is free the reel 76 is not driven but is stationary, or, in other words, the three parts 71, 76 and 73 act in the manner of the ordinary differential gearing.

Secured to the reel 76 is the winding tape 78, said winding tape passing over one or more idler wheels 79 (Fig. 1) arranged on the frame of the typewriter, and having its opposite end secured to the movable carriage 16' so that when a pull is exerted on the tape 78 the carriage will be slid or moved in its bearings to return it to its initial operating position.

The operation of returning the carriage is as follows: Assuming that the parts are in the position shown in Fig. 3, the brake band being free of the brake wheel, then when it is desired to return the carriage, the striking plate 64 is depressed to the dotted-line position shown in Fig. 9, whereupon the lever 60 is raised at its rearward end, as shown in dotted lines, the pin 62 being engaged in the hook 15 of the lever 13, and the U member 10—11 having its cam-engaging surface moved inwardly so as to be engaged by the cam 14 on the part 12 secured to the movable carriage. Simultaneously with the engagement between the levers 13 and 60, the brake band 69 is tightened about the sheave 73, because, as shown in Fig. 9, the links 65 and 66 are moved upwardly to the dotted line positions against the tension of the coil springs 70. The continuously rotating drive shaft 22 acting through the differential gearing will wind the tape 78 upon the reel 76 as long as the brake sheave 73 is held stationary, the winding action of the tape continuing until the cam 14 engages the U bar 10—11, which moves the lever 13 rearwardly, as shown in Fig. 9, the rearward movement of the lever releasing the pin 62 from the hook 15, whereby the spring 63 throws the lever 60 to its normal position, releasing the links 65 and 66 to release the brake band 69.

In connection with the return of the carriage it must be noted that the carriage return is adjustable, because, as shown in Fig. 1, the bar 9 is slidable in the lever 13 and the U bar 10—11 is slidable relative to the rods 7 and 8, so that the carriage return may be adjusted to any predetermined carriage travel, substantially that of the setting of the marginal stop 6.

In order to operate the spacing mechanism (not shown) so as to space words, I have pivoted the forward end of the spacer bar 81 at 83 to a link 82 (see Fig. 3). At the lower end of the link 82 is positioned an offset arm 84, pivoted at 85 to the link 82 so as to have a pivotal movement independently of the spacer bar and having an arcuate end 86. A pin 87 is arranged on the link 82 so as to limit the movement or play of the arm 84 in one direction, the opposite direction of movement of the arm being limited by abutting against the end of the spacer bar 81. At the outer end of the rod 54 is arranged a lever 88, said lever having an anti-friction roller 89 at the rear end thereof adapted to operatively engage the arcuate end 86 of the arm 84 until it hits the stop 87, and swings the link 82 rearwardly to move the spacer bar 81 rearwardly to operate the spacing mechanism. In normal operation, as the operator's hands are lifted from the keyboard at the end of words, the link 55 raises to the full line position shown in Fig. 3, thereby partially rotating the rockshaft 54, which in turn moves the lever 88 downwardly, striking the arm 84 and actuating the spacer bar 81. The subsequent placing of the operator's hands on the keyboard or the lowering thereof for the beginning of the next word raises the arm 88 to the dotted-line position shown in Fig. 3, said raising movement of the arm producing no movement of the spacer bar 81, due to the pivotal play of the arm 84 when it is moved upwardly, the pivotal movement of said arm being limited by the end of the spacer bar 81.

In order to provide an automatic stop means for the writing at the end of the line, I have shown a lever 90 secured to the bar 8 and pivotally movable to the dotted line position shown in Fig. 2 to engage the inner free end of the lever 91 secured to the rock shaft 57. The pivotal movement of the lever 91 will rock the lever 56 to raise the locking bar 52 and hold it locked in place against the lower free ends of the type keys 17. Any suitable means for automatically effecting the locking of the lever 90 with the lever 56 may be employed, as for instance, a link 92 pinned to the shaft 8 and having an offset end 93 engageable with the lever 94 ordinarily found on the typewriter. The lever 94 is rocked by the rocking of the marginal stop 5, said stop being adjustable to be rocked by the carriage at any predetermined point of carriage travel. Shifting the carriage to its starting point pivots the lever 94 to release the interengagement of the lever 90 and 91.

Having thus described my invention, it is obvious that various immaterial modifications may be made in the same without departing from the spirit of my invention; hence I do not wish to be understood as limiting myself to the exact form, arrangement, construction and combination of parts herein shown and described, or uses mentioned.

What I claim as new and desire to secure by Letters Patent is:

1. In a machine of the kind described and in combination, key levers for type bars, type keys, word spacing mechanism, means for locking said keys against accidental operation, said means being controlled by the weight of the operator's hands, and means controlled by the lifting of the operator's hands from said first-mentioned means for automatically operating said spacing mechanism.

2. In a device of the kind described and in combination, a continuously driven shaft, a key lever, a type key spaced from said key lever, a cam loosely mounted on said drive shaft and engageable with said key lever, said cam provided with a pivoted member frictionally engageable with said shaft to form a clutch means between said cam and shaft, and means for operating said clutch means to drive said cam to intermittently actuate said key lever and release said cam after each actuation of said key lever, said means being controlled by said key.

3. In a device of the kind described and in combination, a drive shaft, a key lever, a pair of cooperating adjacent cam disks loosely mounted on said drive shaft, one of said disks being operatively engageable to intermittently actuate said key lever, a clutch for releasably connecting said disks and means for holding said cams to release said clutch to allow said shaft to overrun after each actuation of said key lever.

4. In a device of the kind described and in combination, a drive shaft, a key lever, a pair of cooperating adjacent cam disks loosely mounted on said drive shaft, one of said disks being operatively engageable to intermittently actuate said key lever, a clutch for releasably connecting said disks to said shaft, and means for holding said cams to release said clutch to allow said shaft to overrun after each actuation of said key lever, said means comprising a bell crank lever, and a pawl carried thereby, said pawl being detachably engageable with said type key, whereby when said key is depressed it will release said pawl to operate said clutch.

5. In a device of the kind described and in combination, a drive shaft, a pair of cooperating cam disks mounted on said shaft and resiliently connected together with a limited rotary movement therebetween, a clutch mechanism mounted upon one of said cam disks and controlled by the other cam disk, means arranged to normally maintain the latter cam disk in inoperative position, said means comprising a resiliently operated bell crank lever, a pawl mounted on said lever and a key lever arranged to release said bell crank lever, whereby the operation of the key lever will permit said clutch mechanism to engage the shaft in the manner specified.

6. In a device of the kind described and in combination, a drive shaft, a key lever, a pair of cooperating adjacent cam disks loosely mounted on said drive shaft and having a limited rotational play therebetween, one of said cam disks being operably engageable to intermittently actuate said key lever, a clutch for releasably connecting said disks to said shaft, means for holding said disks to release the clutch and allow said shaft to overrun after each actuation of said key lever, said means comprising a bell crank lever, a pawl carried thereby, said pawl being detachably engageable with said type key, whereby when said type key is depressed it will release said pawl to operate said clutch, said shaft driving said cam a predetermined amount when clutched so as to intermittently operate the key lever and permit it to be declutched after each key lever operation.

7. In a device of the kind described and in combination, a frame, word spacing mechanism, and key-controlled means for operating said spacing mechanism, said means comprising a spacer bar connected at one end to said spacing mechanism, an offset member connected to the other end of said bar, an arm operatively engageable with said offset member, and a key for controlling the movement of said arm, said key being so positioned during normal operation of the typewriter that said arm is out of operative engagement with said offset member, the releasing of said key causing the arm to operatively engage said offset member to actuate said spacer bar.

8. In a device of the kind described and in combination, a frame, word spacing mechanism, and key-controlled means for operating said spacing mechanism, said means comprising a spacer bar connected at one end to said spacing mechanism, an offset member pivotally connected to the other end of said bar, means for limiting the pivotal movement of said offset member in one direction, an arm operatively engageable in one direction of movement with said offset member and inoperatively engageable therewith in the opposite direction of movement, and a key for controlling the movement of said arm, said key being so positioned during normal operation of the typewriter that said arm is out of operative engagement with said offset member, the releasing of said key causing the arm to operatively engage said offset member to actuate said spacer bar.

9. In a device of the kind described and in combination, a frame, a plurality of key levers, a carriage, word spacing mechanism to shift the carriage, and including a spacer bar, a second bar pivotally connected to and supporting said spacer bar, an offset arm pivotally carried by said second bar, means for limiting the movement of said offset arm in opposite directions, said offset arm having an arcuate surface, a roller engageable with said arcuate surface, a bell crank lever pivoted to said frame and carrying said roller, a key connected to said bell crank so as to control the movement thereof, said key adapted to be normally kept depressed when the typewriter is being operated, whereby the releasing of said key at the end of a word will move said bell crank so that said roller engages and actuates said pivotally mounted offset arm to actuate said spacer bar to shift the carriage.

10. In a power driven operating mechanism for typewriters and the like, comprising a series of key levers and operating means therefor, a series of corresponding controlling keys, automatically operable means arranged to normally lock the controlling keys against operation, and means operative at will to render said locking means inoperative.

11. In a device of the kind described and in combination, a plurality of key levers and type keys, and automatic means for locking said keys to prevent the accidental operation thereof, said means comprising a bar pivoted to a typewriter frame and engageable with said keys and serving as an abutment stop therefor, and means operated by the weight of the operator's hands during the normal operative use of the typewriter for disengaging said bar from said keys.

12. In a device of the kind described and in combination, a frame, a plurality of key levers and type keys, and locking means for preventing the accidental operation of said keys, said means comprising a bar pivotally carried on said frame and engageable with all of said keys, a lever for controlling said bar, said lever extending upwardly and forming a hand rest for the operator, whereby the lever is yieldably depressed during the normal operation of the machine to throw said bar out of locking engagement with said type keys, the lifting of the operator's hand permitting said lever to automatically lift and move said bar into locking engagement with said key levers.

13. In a device of the kind described and in combination, a frame, a plurality of key levers, a plurality of type keys, and intermediate means for operating said key levers through said type keys, said means comprising a continuously driven shaft, cams each operably connected with one of said key levers, a clutch for intermittently connecting and releasing each of said cams and drive shaft, a bell-crank lever controlling said clutch, said bell-crank lever being controlled by said key, and means for preventing said key levers from repeating.

14. In a device of the kind described and in combination, key levers, keys, a continuously driven shaft, a plurality of cams carried by said drive shaft and each operatively connected with one of said key levers, and means for intermittently connecting said cams to said drive shaft, means whereby said cams will release from driving engagement with said shaft after each actuation of said key lever, said means comprising a clutch intermediate each of said cams and shaft, individual bell-cranks controlling the movement of each of said clutches, and pawls connected to said bell-cranks and releasably engageable with said keys, whereby the operating of a key operates its respective bell-crank to clutch said cam to the shaft and actuate the key lever.

15. In a device of the kind described and in combination, key levers, type keys, a continuously driven shaft, cams each comprising a pair of discs carried by said drive shaft, one of each of said pair of discs being operatively connected with one of each of said key levers so as to intermittently actuate it, the discs of each pair having rotational play therebetween, an over-running clutch carried by one of said pair of discs releasably engageable with said shaft and operated by the relative rotational movement of said discs, and means controlled by said key for clutching and releasing said shaft and cam discs to intermittently actuate said key lever.

16. In a device of the kind described and in combination, key levers, type keys, a continuously driven shaft, cams each comprising a pair of disks carried by said drive shaft and having a limited rotational play therebetween, one of each of said pair of disks being operatively connected with one of each of said key levers so as to intermittently actuate it, a pin carried by one of said pairs of cam disks, a shaft-engaging dog pivotally mounted on the other of said pair of cam disks and having an aperture for loosely receiving said pin, a second pin carried by the disk carrying said first-mentioned pin, a spring tending to move said disks relatively to one another to clutch said cams to shaft, an abutment on one of said disks, a bell-crank lever having one end engaging said abutment and holding said clutch released from said shaft, said bell-crank lever being controlled by said key, whereby the releasing of said bell-crank lever will cause said spring to move said disks relatively to one another to throw said dog into clutching engagement with said shaft, whereby said cam disks are driven to actuate said key lever.

17. In a device of the kind described and in combination, a plurality of key levers, a plurality of pivotally mounted type keys, a pin carried by each of said keys, a continuously driven shaft, cams operatively connected to intermittently operate each of said key levers, an overrunning clutch intermediate each of said cams and drive shaft, disks having an abutment thereon and controlling said clutches, a pivotally mounted bell-crank lever engageable with each of said abutments, a pawl carried by each of said bell-cranks and engageable with the pins carried by said keys, means for yieldingly urging said pawls downwardly, and means for preventing said key levers from repeating, said last mentioned means comprising a hook on said pawl, and a stationary bar on said frame engageable with said hook when said key is maintained depressed, said pin on said key engaging said pawl and lifting it off said bar upon the lifting of said key.

18. In a device of the kind described and in combination, a plurality of key levers, pivotally mounted type keys each having a pin projecting therefrom, a drive shaft, cams on said drive shaft, each operably connected with one of said key levers, said cams comprising a pair of adjacent disks having relative rotational play therebetween, a pin carried by one of said disks, a clutch between the other of said disks and shaft and loosely receiving said pin, spring means for urging said clutch into operative engagement with said shaft to drive said cam, a bell-crank lever having one arm engageable with said disks to hold the clutch out of operating engagement with the shaft, a pawl pivotally carried at the other end of said bell-crank lever and controlling the movement thereof, a pair of spaced hooks on said pawl, one of said hooks being engageable with said pin on the key, a stationary bar on said frame and serving as a stop for said pawl in its downward movement, whereby the depressing of said key will cause said pawl to engage said abutment to release the last mentioned pin from said hook, to release said bell-crank lever from its engagement with said disk to throw said clutch into operative engagement with said shaft and operate the key lever, the holding of said key in its depressed position causing the second of said hooks of the pawl to engage said stationary bar, a subsequent releasing of said key engaging said pawl to release said second hook from the bar and engage the first hook with the pin carried by said key, whereby the subsequent depressing of said key will release said pawl and bell crank lever to clutch said cam to the shaft to operate the type bar.

19. In a device of the kind described and in combination, a writing machine comprising a movable carriage, and means for returning said carriage to its normal position after it has reached the end of its predetermined travel, said means comprising a continuously driven shaft, a brake wheel freely revoluble on said drive shaft, a reel on said shaft, a tape connecting said reel and carriage, means operatively connecting said wheel and reel, and means for retarding said brake wheel to operate said last mentioned means to wind said reel.

20. In a device of the kind described and in combination, a writing machine, comprising a movable carriage, and means for returning said carriage to its normal position after it has reached the end of its predetermined travel, said means comprising a continuously driven shaft, a brake wheel freely revoluble on said drive shaft, a reel on said shaft, means intermediate said reel and wheel operatively connecting them, a tape connecting said reel and carriage, means for retarding said brake wheel to operate said last mentioned means to wind said tape on said reel, and means for automatically releasing said brake wheel retarding means when the carriage has been returned an adjustably predetermined distance.

21. In a device of the kind described and in combination, a writing machine comprising a shiftable carriage and means for returning said carriage to its normal position after the end of its predetermined travel, said means comprising a drive shaft, a reel freely revoluble on said drive shaft, a tape connected at one end to said carriage, and at its other end to said reel, a gear wheel secured to said shaft, a brake wheel freely revoluble on said shaft and having a gear face thereon, pinions freely mounted on said reel and having a rotational axis transversely to said drive shaft and adapted to mesh with both said gear wheel and the gear on said brake wheel, a brake band encircling said brake wheel, and means for tightening said brake band to hold said brake wheel stationary so that the tape reel is rotatably driven by said gear wheel, to wind said tape and return said carriage, and means for automatically releasing said brake band at any predetermined point of carriage travel, said means comprising a cam carried by said movable carriage and an adjustably movable brake releasing cooperating means operatively engageable by said cam.

22. In a device of the kind described and in combination, a writing machine comprising a frame, a shifting carriage slidably mounted in said frame, and means for returning said carriage after the end of its travel, said means comprising a drive shaft, a reel mounted on said drive shaft, a tape having one end connected to the said carriage and its other end to said reel, a brake wheel on said drive shaft, a differential gearing between said brake wheel, shaft and tape reel, whereby when said brake wheel is held fixed relatively to said shaft the tape will be wound on said reel.

23. In a device of the kind described and in combination, a writing machine comprising a frame, a shifting carriage slidably mounted in said frame, and means for returning said carriage after the end of its travel, said means comprising a drive shaft, a reel mounted on said drive shaft, a tape having one end connected to the said carriage and its other end to said reel, a brake wheel on said drive shaft, a differential gearing between said brake wheel, shaft, and tape reel, whereby when said brake wheel is held fixed relatively to said shaft the tape will be wound on said reel, a brake band for controlling said brake wheel, a lever for manually operating said brake band, and means for automatically releasing said lever to release said brake band when said carriage has reached a predetermined path of its return travel.

24. In a device of the kind described and in combination, a writing machine comprising a frame, a shifting carriage slidably mounted in said frame, and means for returning said carriage after the end of its travel, said means comprising a drive shaft, a reel mounted on said drive shaft, a tape having one end connected to the said carriage and its other end to said reel, a brake wheel on said drive shaft, a differential gearing between said brake wheel, shaft, and tape reel, whereby when said brake wheel is held fixed relatively to said shaft the tape will be wound on said reel, a brake band for controlling said brake wheel, a lever for manually operating said brake band, and means for automatically releasing said lever to release said brake band when said carriage has reached a predetermined path of its return travel, said means comprising a cam carried by said movable carriage, a pivoted arm adjustably mounted on said frame and operatively engaging said operating lever, to release said brake at any predetermined point, spring means between said arm and operating lever, said cam being operatively engageable with said pivoted arm to release said brake and stop the return movement of said carriage, whereupon said spring will return said lever to its normal position.

25. In a power driven typewriter of the character described, comprising a longitudinally movable carriage, printing mechanism including a series of type and key levers, operating means for the key levers, a bank of controlling keys for the printing mechanism, a movable hand rest arranged in proximity to the keys and adapted to normally lock the keys against accidental operation, and means adjustably carried by the carriage and arranged to operate the hand rest to lock the control keys when the carriage reaches a predetermined point in its longitudinal movement.

26. A mechanism comprising a rotary shaft, a pair of coaxial, adjacent operating cams carried thereby, and means for controlling the the operation of said cams, comprising a clutch between said shaft and cam to releasably drive said cams from said shaft, a bell-crank lever controlling said clutch, and means for releasably holding said lever in inoperative position.

27. A mechanism comprising a rotary shaft, a pair of coaxial, abutting cooperating cams loosely mounted thereon and resiliently interconnected so as to have a limited rotational play therebetween, a shaft-engaging clutch loosely mounted on one of said cams and operable by the other cam, means controlling said last mentioned cam for normally maintaining said clutch out of engagement with said shaft, and means for releasing said last mentioned means to partially rotate said last mentioned cam, whereby said clutch is moved to operatively engage said shaft.

28. A power driven operating mechanism for typewriters and the like, comprising a continuously driven shaft, a series of key levers and operating means therefor, a series of controlling keys, one for each of said key levers, to momentarily connect said levers to said shaft and then release them therefrom, automatically operable means arranged to normally lock the controlling keys against operation, and means operative at will to render said locking means inoperative.

In testimony whereof, I have hereunto signed my name in the presence of two subscribing witnesses.

DANIEL W. SHIEK.

Witnesses:
BEN V. ZILLMAN,
H. C. JACOBS.